US010062083B2

(12) United States Patent
Shiftan et al.

(10) Patent No.: US 10,062,083 B2
(45) Date of Patent: Aug. 28, 2018

(54) METHOD AND SYSTEM FOR CLUSTERING AND CLASSIFYING ONLINE VISUAL INFORMATION

(71) Applicant: CURALATE, INC., Philadelphia, PA (US)

(72) Inventors: Nicholas Aaron Shiftan, Philadelphia, PA (US); Apu Sorabh Gupta, Philadelphia, PA (US); Brendan William Lowry, Philadelphia, PA (US); Louis Kratz, III, Philadelphia, PA (US)

(73) Assignee: Curalate, Inc., Philadelphia, PA (US)

(*) Notice: Subject to any disclaimer, the term of this patent is extended or adjusted under 35 U.S.C. 154(b) by 539 days.

(21) Appl. No.: 14/773,703

(22) PCT Filed: Mar. 10, 2014

(86) PCT No.: PCT/US2014/022862
§ 371 (c)(1),
(2) Date: Sep. 8, 2015

(87) PCT Pub. No.: WO2014/138745
PCT Pub. Date: Sep. 12, 2014

(65) Prior Publication Data
US 2016/0048849 A1 Feb. 18, 2016

Related U.S. Application Data

(60) Provisional application No. 61/775,187, filed on Mar. 8, 2013.

(51) Int. Cl.
*G06K 9/46* (2006.01)
*G06K 9/62* (2006.01)
(Continued)

(52) U.S. Cl.
CPC ... *G06Q 30/0201* (2013.01); *G06F 17/30247* (2013.01); *G06F 17/30265* (2013.01);
(Continued)

(58) Field of Classification Search
CPC ........... G06K 9/46; G06K 9/4661; G06K 2009/4666; G06K 9/4671; G06K 9/4676;
(Continued)

(56) References Cited

U.S. PATENT DOCUMENTS 7,167,574 B2 * 1/2007 Kim .......................... 382/100
2004/0103101 A1 * 5/2004 Stubler et al. ............. 707/100
(Continued)

FOREIGN PATENT DOCUMENTS

EP 2 138 957 A2 * 12/1999 ............. G06F 17/30

OTHER PUBLICATIONS

Atupelage et al., "Quantifying the Visual Content Perceived in DCT Coefficients and PKI based Semi-Fragile Watermarking for Visual Content Authentication of Images", IEEE Advances in Electrical and Electronics Engineering—IAENG Special Edition fo the World Congress on Engineering and Computer Science, 2008, pp. 275-286.*

(Continued)

*Primary Examiner* — Andrew W Johns
(74) *Attorney, Agent, or Firm* — Seed IP Law Group LLP

(57) ABSTRACT

A scalable system to provide a means for a brand manager, marketer, consultant, or researcher to identify, monitor, measure, and rank the propagation of a brand's digital imagery across the web, including the social web, the system configured to implement a novel process in which digital image files obtained from social networks that are perceptually similar (i.e., appear identical to the human visual system), but whose digital representation differs, are identified, data associated with the images files is clustered into
(Continued)

groups, each group representing a common single piece of content that originated from the user, and enabling a user to access and organize the clusters of brand image data to measure and track the engagement of users on the social network with that brand image content, thereby providing measurable statistics for the user.

19 Claims, 3 Drawing Sheets

(51) Int. Cl.
*G06Q 30/02* (2012.01)
*G06F 17/30* (2006.01)
*G06Q 50/00* (2012.01)
*G06T 3/00* (2006.01)
*G06T 3/40* (2006.01)

(52) U.S. Cl.
CPC .. *G06F 17/30598* (2013.01); *G06F 17/30867* (2013.01); *G06K 9/4661* (2013.01); *G06K 9/6215* (2013.01); *G06K 9/6218* (2013.01); *G06Q 30/0241* (2013.01); *G06Q 50/01* (2013.01); *G06T 3/0093* (2013.01); *G06T 3/40* (2013.01); *G06T 2207/20052* (2013.01)

(58) Field of Classification Search
CPC ...... G06K 9/6215; G06K 9/6218; G06T 9/00; G06F 17/30247; G06F 17/30256; G06F 17/30598; G06F 17/30601
See application file for complete search history.

(56) References Cited

U.S. PATENT DOCUMENTS

2011/0038541 A1* 2/2011 Bober et al. .................. 382/175
2011/0305399 A1* 12/2011 Zitnick et al. ................ 382/225

OTHER PUBLICATIONS

Jain et al., "Data Clustering: A Review", ACM Computing Surveys, vol. 31, No. 3, Sep. 1999, pp. 264-323.*
Naturel et al., "A Fast Shot Matching Strategy for Detecting Duplicate Sequences in a Television Stream", Proc. ACM Int'l Workshop on Computer Vision Meets Databases, Jun. 2005, pp. 21-27.*
Norouzi et al., "Fast Search in Hamming Space with Multi-Index Hashing", IEEE Conf. on Computer Vision and Pattern Recognition, Jun. 2012, pp. 3108-3115.*

* cited by examiner

METHOD AND SYSTEM FOR CLUSTERING AND CLASSIFYING ONLINE VISUAL INFORMATION

BACKGROUND

Technical Field

The present disclosure pertains to image processing and information retrieval and, more particularly, to an image-centric process of capturing, clustering, and analyzing image data to determine and measure brand interactions in social media and other online platforms.

Description of the Related Art

Social media is widely accepted today as an important marketing, outreach, and advertising channel for product and service brands. As brand owners invest resources in building their social media presence, it is critical that they are able to accurately measure the impact and the nature of brand presence.

As a starting point, a brand owner may need to understand the overall size of their brand presence (as measured, for example, in a count of brand interactions, brand impressions, or brand followers). Diving deeper, a brand owner may also need to understand which social media interactions are having the highest ROI; for example, which posts are receiving the most attention (as measured in likes, comments, repins, impressions, etc.).

Traditionally, this type of social media analysis has been conducted using keywords or hashtags. This type of text-based social media analysis is well understand and has been extensively publicly described. Current logo and object recognition techniques identify a particular pattern (i.e., a logo or object) that may only be part of an image. In addition, logo and object recognition techniques aim to be invariant to in- or out-of-plane rotations.

As the prevalence of image sharing on social media channels has increased, the utility of purely text-based social media analysis has decreased. When consumers share images, they will often fail to provide adequate captions or other metadata; they are assuming, rightly, that an image speaks for itself. While an image may be worth a thousand words, it is equivalent to zero words from the perspective of a purely-textual approach to social media analysis. To make sense of visual social media posts, an image-centric approach is needed.

BRIEF SUMMARY

The present disclosure pertains to a system and method that enables comprehensive measurements around the introduction and propagation of a brands imagery across social media platforms and other online sources, including (but not limited to) Pinterest, Tumblr, Instagram, Facebook, Twitter, Fancy, Wanelo, Polyvore, Houzz, and others.

In accordance with one aspect of the present disclosure, the system provides a means for a content owner (henceforth defined as the user) to identify, measure, and track any amount of digital imagery on online networks. Specifically, the system identifies digital image files from social networks that are perceptually similar (i.e., appear identical to the human visual system), but whose digital representation differs. After identifying these images, the system clusters them into groups, each of which represents a single piece of content that originated from the user. Finally, the system measures and tracks the engagement of users on the social network with that content, providing measurable statistics for the user. The entire system is scalable, allowing any amount of content to be measured concurrently.

In accordance with another aspect of the present disclosure, a system and method of identifying perceptually identical digital images (i.e., those that appear the same to the human visual system) on online social networks is provided. This differs from partial detection techniques such as object or logo detection in a key way: the technique of the present disclosure identifies images that look identical in their entirety. Current logo and object recognition techniques, in contrast, identify a particular pattern (i.e., a logo or object) that may only be part of an image. In addition, logo and object recognition techniques aim to be invariant to in or out of plane rotations, while the technology of the present disclosure differentiates between subject matter captured from different views.

Preferably, the system of the present disclosure is built using a service-oriented architecture (SOA), and as such, it is decomposed into four logically distinct components (hereafter, "services").

The system and process includes an ingesting component that is configured to provide raw data representing image-based interactions across all applicable social media (and other online) platforms. Upon ingest, these interactions are marshaled into a common data structure that includes, significantly, an image identifier. This image identifier is associated with a specific canonical image in a global image database. During this process, identical and perceptually-identical images are de-duplicated.

Next, a brand interaction can be associated with one or more brands by comparing its image identifier with a collection of image identifiers known to be associated with the given brand. The exact nature of this comparison is configurable by the owner, user, or analyzer (hereinafter user) of the brand in question; users may choose to restrict matches to identical images or may choose to include brand imagery that has undergone cropping, resizing, color correction, compression or other image transformations.

The end result of this process is a database of social media interactions, grouped by both brand and image. This allows analysis at both a brand and product level.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

Figure 1:
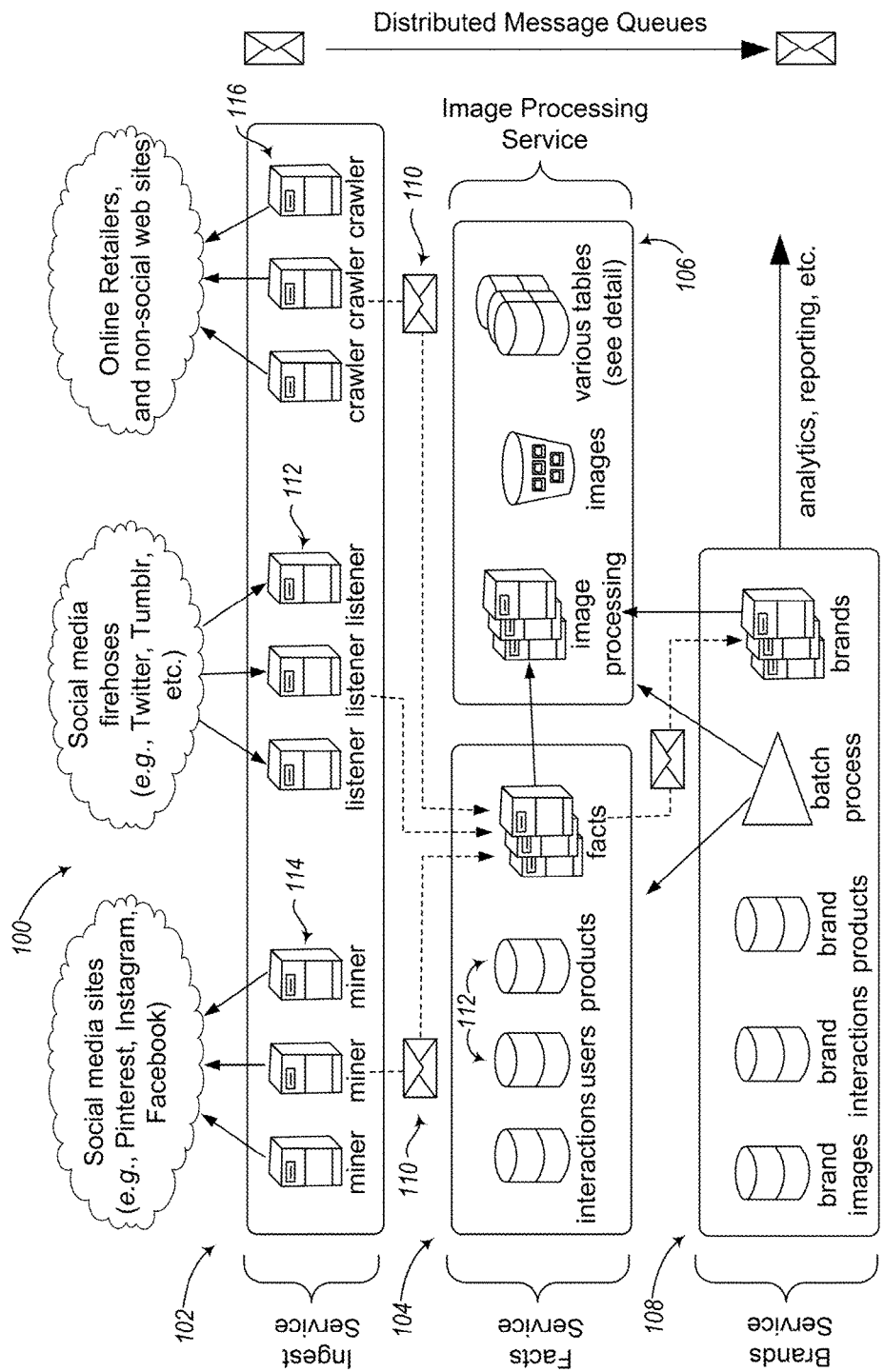
FIG. 1 is a logical diagram of the system formed in accordance with the present disclosure.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with methods and systems for clustering and classifying online visual brand interactions, including but not limited to computer processors, Internet communication devices, and databases, have not been shown or described in order to avoid unnecessarily obscuring descriptions of the embodiments.

Unless the context requires otherwise, throughout the specification and claims that follow, the word comprise and variations thereof, such as comprises and comprising are to be construed in an open inclusive sense, that is, as including, but not limited to. The foregoing applies equally to the words including and having.

Reference throughout this description to one embodiment or an embodiment means that a particular feature, structure, or characteristic described in connection with the embodiment is included in at least one embodiment. Thus, the appearance of the phrases in one embodiment or in an embodiment in various places throughout the specification are not necessarily all referring to the same embodiment. Furthermore, the particular features, structures, or characteristics may be combined in any suitable manner in one or more embodiments.

The system disclosed herein provides a means for a brand manager, marketer, consultant, or researcher to identify, monitor, measure, and rank the propagation of a brand's digital imagery across social web and the web. In this context "brand" is intended to embrace words, phrases, taglines, trademarks, service marks, text, signs, design, logos, graphic images and any visually perceivable device that associates goods, products, services of all types with a single source. Moreover, when used in the context of a global computer network, such as the Internet, including social networks and other online content, brand data would include, without limitation, the definition of brand set forth above along with associated digital data, product photos, and user-generated content related to or associated with the brand.

In the past few years, there has been an explosion of image sharing online (across networks like Pinterest, Instagram, Tumblr, and others). The good news for brand managers is that image sharing is an inherently rich medium. When people "speak" with images, they tend to communicate substantially more data than they do with a sentence or two of text. For example, a Facebook "like" communicates only one bit of information: that the end-user has expressed some affinity for a specific brand. To contrast this, consider a "pin" of a product image on Pinterest. Implicit in that pin is a tremendous amount of data, e.g. which specific product for which the user has an affinity, how he/she prefers to see it photographed, which color they like the product in, etc.

There is substantial value in these image centric interactions. In order to realize the value, it necessary to extract a large amount of data from the image itself. This is referred to herein as needing to restore context to content. This content includes, but is not limited to:
  who owns the image
  what product it represents
  how popular is the image—e.g. how often is it being shared online
  how do end-users describe this image when they share it online, etc., (location data, temporal date, licensing/permission data, etc.)

The challenge here is tying together these disparate data points when the only constant among them is the image. The system and method disclosed here provides a solution in which these various data layers are connected together via the image itself. Hence, in database parlance, the image is the primary key.

As those skilled in the art will appreciate, images make terrible primary keys as described more fully herein below. To be able to rank and understand images, the "image space" is clustered into a set of discrete image identifiers that are then suitable primary keys. The present disclosure provides a system and method for clustering and classifying images that can scale to keep up with the rate of online image sharing (upwards of one billion images per day as of 2013).

With the system and method of the present disclosure, users are able to:
  understand which product images are being shared online at the highest frequency;
  understand, for a given product, which image of that product is being shared online at the highest frequency;
  understand, for a given product, how end-users tend to describe the product when they share images of it online;
  use the above data to optimize their social media strategy to share images that are statistically more likely to generate end-user engagement;
  use the above data to optimize their in-store or e-commerce experience (e.g. ensure that products/images that tend to generate user engagement are front and center); and
  use the above data to generate dynamic display advertising units (e.g. ones that algorithmically choose which visual assets to include based on social signals).

Top-Level Overview

The present disclosure is ideally implemented as shown in FIG. 1 as a distributed computing system 100 that can be logically divided into four components (hereafter, "services"):
  Ingest Service 102
  Facts Service 104
  Image Processing Service 106
  Brands Service 108

Broadly speaking, the Ingest Service is configured to be responsible for receiving and retrieving brand image data 110 around new and updated social media interactions from monitored social media sites and other online platforms.

The Facts Service is configured to be responsible for marshaling ingested data 110 into common data structures and persisting this data on durable media 112.

As part of this process, all images associated with the visual interaction will be synchronously processed via the Image Service and replaced with an image identifier.

Finally, the Brands Service is configured to be responsible for mapping images to zero or more brands and grouping interaction data by brand and image. The Brands service may also be configured to optionally use brand-owner supplied metadata to group images by product family, SKU, or other arbitrary segment.

Inter-Service Communication

Although the system could conceivably be implemented in a single physical device, in practice it ideally is distributed across multiple computing instances in order to scale and handle the ingesting and processing of data from modern social media sites and other online platforms. To coordinate actions between various layers of the system, a distributed messaging system such as ActiveMQ, RabbitMQ, ZeroMQ, Kestrel, Kafka, or Amazon Simple Queue Service is employed.

Intra-Service Communication

For the purpose of simplifying this disclosure, it can be assumed that intra-service communication and coordination takes place via a provider of shared state, such as (by not restricted to) a relational database or a key-value store.

Ingest Service

The Ingest service 102 is responsible for the intake of interaction data 110 from the desired social media networks and other web platforms. As discussed above, the service may contain heterogeneous instances responsible for the intake of data from different social media platforms. The implementation of a given instance will depend heavily on the network/platform in question, but can be broadly classified into three instance types:

"LISTENER" instances 112 for social networks that provide a push API (hereafter, a "firehose").

"MINER" instances 114 for social networks or web platforms that provide a traditional pull API.

"CRAWLER" instances 116 for other web platforms that don't expose a public API.

To consume data from social networks that offer a firehose, LISTENER instances 112 will be responsible for providing the push API with a valid endpoint. This endpoint may take the form of an HTTP/HTTPS server, a UDP socket, or a message queue listener (e.g. RabbitMQ, ActiveMQ, etc.) The LISTENER instances 112 will also be responsible for throttling messages as necessary to ensure none are dropped.

TABLE 1

INTERACTIONS Table

| Network | indexed | Primary Key |
|---|---|---|
| Interaction Type | indexed | |
| Interaction Identifier | indexed | |
| Observation Timestamp | indexed | |
| File Id | indexed | |
| Other meta-data | | |

If the network in question does not offer a firehose, but instead offers a standard documented REST/SOAP API, then a cluster of miner instances 114 may be configured to consume data from the documented API.

There are many cases when it will be desirable to consume visual interactions from web platforms that do not offer a documented API. In these cases, it will be necessary to implement or cause implementation of a distributed web crawler to retrieve data from the network in question. These crawler instances 116 may use either a global or undirected crawling strategy or they may use a strategy that focuses extra attention on certain users, user groups, product categories, or other subsets of the platform in question. Crawling may be implemented from scratch or by configuring a custom strategy with an open-source crawling framework such as Apache Nutch.

Facts Service

The role of the Facts Service 104 is two-fold:

1. To normalize and persist all visual interaction data 110 on durable media, using the Image Processing Service 106 to map each visual interaction to one or more image identifier.

2. To expose the interaction data via useful query patterns to the Brands Service 108.

Normalization is performed to ensure that data can be later retrieved or queried on useful indices; for example, we may wish to grab all interactions by a specific user. At a minimum, data should be normalized and persisted into the following tables.

INTERACTIONS (Table 1)

The Facts Service 104 is so-named because it becomes the source of truth for all subsequent data analysis. As a result, it must be append-only, and all records must be time stamped when written. Data may not be altered; instead, if data has been updated, it should be re-written with an updated timestamp. Data should never be deleted, although records may be moved into cool or cold storage when necessary. These data tables may be implemented via a partitioned relational database such as, without limitation, MySQL, Microsoft SQL Server, PostgreSQL or Oracle. Given the scale of the data in question, it may be preferable from a cost and reliability perspective to use a NoSQL database such as Apache HBase, Apache Cassandra, MongoDB, or Amazon DynamoDB.

To map each social interaction to an image identifier such as File Id (as referenced above), the Facts Service will make a request to the Image Processing Service.

With the File Id determined, all normalized records relating to the data in question, including the record in the INTERACTIONS table, can be persisted to storage.

At this point, the Facts Service 104 should pass the interaction to the Brands Service 108 for further processing.

Image Processing Service

Overview The Image Processing Service 106 is responsible for creating and maintaining groups of image files mined from social networks. Often, perceptually similar images, i.e., those that look identical to the human brain, are shared across different social networks though the digital bits of these files differ. This is due to the wide variety of image processing methods used across the web. This may include, but is not limited to, changes in resolution, compression, or color space of the digital file. The Image Processing Service 106 associates these files into groups of perceptually identical images, effectively identifying unique imagery shared across these social networks.

Specifically, given a new unseen image file, the Image Processing Service 106:

Computes a unique identifier to represent the new, unseen file. This is referred to as the file id.

Identifies which previously seen image files are perceptually similar to the new file.

1Dynamically clusters these perceptually similar files to form a group for each unique image.

Henceforth this process is referred to as digestion. The result of digestion is a mapping of the image file to a group of perceptually similar image files. This group is represented by a canonical image id, a unique identifier to a specific group of image files.

This declaration logically separates digestion into four phases, each of which will be disclosed in detail:

File Processing Downloads the image, computes the file id, and pre-processes the image to isolate the perceptual information.

Fingerprinting Computes a compact digital representation of the image's visual information (i.e., the fingerprint) to optimize comparison of perceptually similar files.

Deduplication Uses the fingerprint, along with a distributed data store, to identify perceptually similar images.

Clustering Takes the perceptually similar images and maintains the file id to canonical id mappings.

Figure 2:
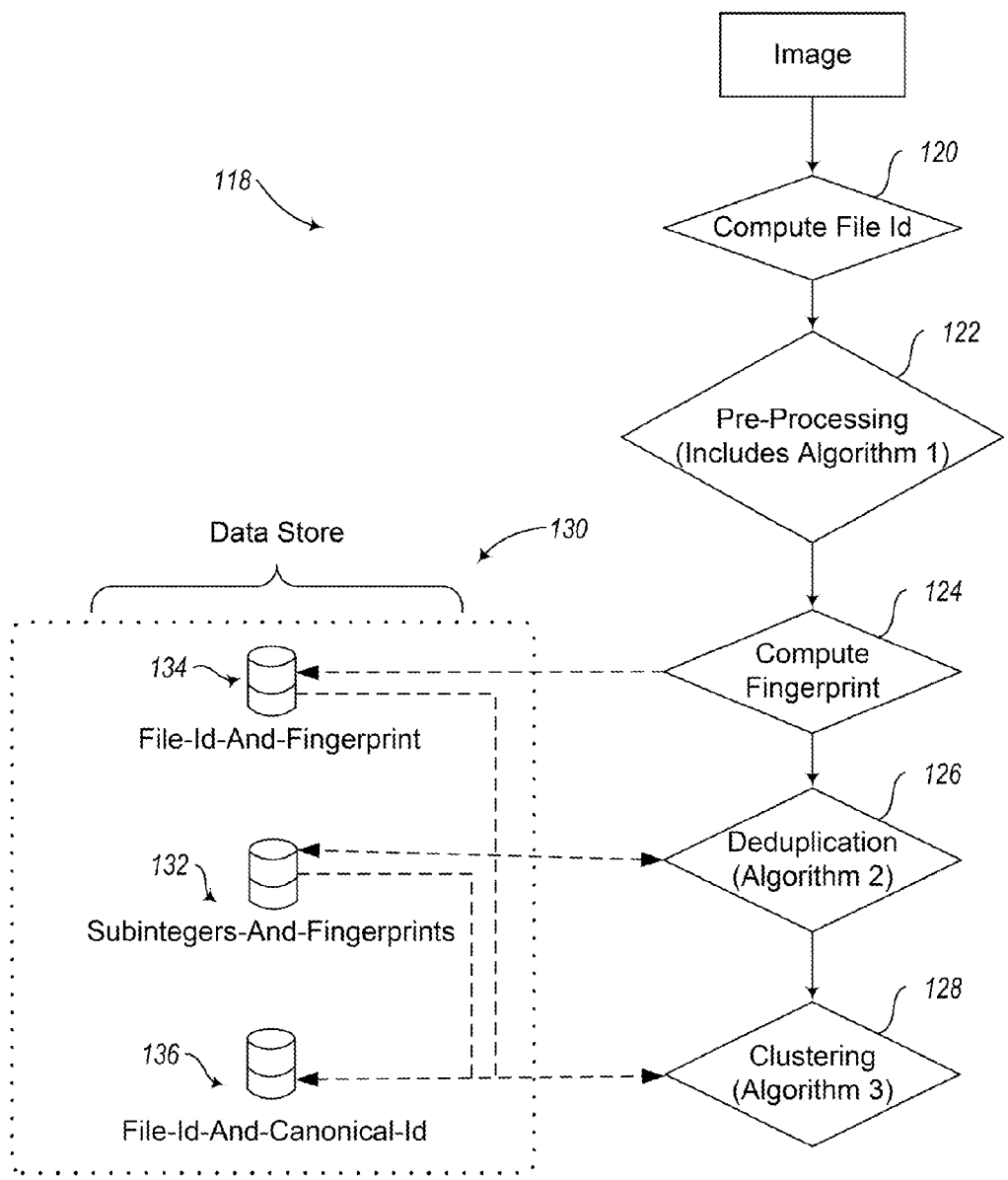
FIG. 2 is a detailed logical diagram of the Image Processing Service.

This process 118 is illustrated in FIG. 2 which includes the phases interactions with the data stores to be defined.

File Processing

Computing the File Id 120

Each visual interaction on the social networks has an associated image URL. In the example of a Pinterest pin, we would use the URL of the pinned image. Similarly, an Instagram post has an associated photo created by the user. If URLs for multiple versions or sizes of image are available, the URL pointing to image with the greatest size, in pixels, is selected. The image is downloaded by the system, and a SHA-256 hash is applied to the bytes of the image to create a string (Base-64) representation of the file (i.e., the file id).

Pre-Processing 122

Next, the system removes unnecessary visual information from the image through a number of pre-processing steps. These steps are designed to reduce extraneous information from corrupting the fingerprinting process. Specifically, the systems:

Extracts the luminance channel of the image

Automatically crops the image to remove empty or near-empty backgrounds

Blurs the image to reduce pixel noise

Scales the image to a fixed width and height

Each of these are discussed in detail in the following sections.

One can imagine alternative embodiments that exclude the above functions, alter their order, or include other pre-processing steps on the image. These may include, but are not limited to, further color space conversions, identification of information-dense areas (such as those defined by texture, saliency, motion, gradients, color, or other visual-specific features), the application of other signal processing techniques, color correction, lighting correction, background removal, saturation-based masking, gamma correction, orientation correction, or any method that extracts or changes the visual or digital properties of the image.

Extraction of the Luminance Channel First, the luminance channel is extracted from the shared image file, and other color information is discarded. If the colorspace of the file contains a luminance channel, it is extracted. If the file uses red-green-blue color-space model (RGB), then a linear combination of these values is used to compute the luminance $$l = 0.299r + 0.587g + 0.114b, \quad (1)$$

where r, g, and b are the red, green, and blue color intensities, respectively. If the image file contains any other color space, then it is converted first to RGB and Eq. 1 is used to compute the luminance.

One can imagine alternative methods for transforming the color data prior to extracting the image fingerprint. Different linear or non-linear transformations on the color channels, combining the color channels (e.g., via expanding, matting, stitching, or other methods), or encoding the color channels in a different order may be applied depending upon the needs of the implementation.

Cropping Cropping is performed to isolate the area of the image containing actual visual information. Two cropping techniques are employed: one that removes solid-color backgrounds, and one that removes textured backgrounds with very high or low frequencies. Both methods return in a region of interest (i.e., a rectangle) that is used to crop the image.

| Algorithm 1 Linear Solid Color Bounding Box Algorithm |
|---|
| Require: Input an image I, tolerance t, and background color c |
| 1: $\nexists \{ \| (x, y) - c \| \leq t \} \in$ I then |
| 2:     return |
| 3: end if |
| 4: $y_s \leftarrow \operatorname{argmin}_y [I(x, y) - c] > t \; \forall x$ |
| 5: $y_e \leftarrow \operatorname{argmax}_y [I(x, y) - c] > t \; \forall x$ |
| 6: $x_s \leftarrow \operatorname{argmin}_x [I(x, y) - c] > t \; \forall y$ |
| 7: $x_e \leftarrow \operatorname{argmax}_x [I(x, y) - c] > t \; \forall y$ |
| 8: return Region $x_s, y_s, x_e, y_e$ |

The system first crops the image to remove any background of solid color. To do so, it applies a linear-bounding algorithm, detailed in Algorithm 1, using the first pixel as the background color c. The result is a possibly defined region of interest around the non-background part of the image.

The second cropping technique applies a bandpass filter to the image using the Discrete Fourier Transform (DFT) to remove textured backgrounds. This occurs in four steps:

1. Apply the Discrete Fourier Transform (DFT) to the input image.

2. Remove high and low frequency coefficients from the DFT result.

3. Apply the inverse DFT to compute the input image with high and low frequency variations removed.

4. Apply Algorithm 1 to the bandpass filtered image. The frequency limits used in step 2 depend upon sensitivity desired by the implementation.

If both techniques return a valid bounding box, then the one with the largest area (in pixels) is used. The image is then cropped to the resulting bounding box.

Alternative bounding box methods may be applied including, but not limited to, those based on different information or statistics (such as edge detection, corners, or features), those using computational geometry techniques, and optimizations thereof.

Blurring Next, the image is blurred to remove high frequency noise. The system applies a Gaussian blur kernel in two dimensions. In order to achieve similar output images for input images with differing resolutions, the kernel size is adapted depending on the input images width. Specifically, the width of the image is used to compute the filter's standard deviation $$\sigma = C * \text{width}, \quad (2)$$

where C is a constant and width is the number of horizontal pixels in the image. This filter is applied on both dimensions of the image, resulting in a blurred artifact.

One can imagine alternative techniques for reducing noise or blurring the image. These may include Gaussian blurring, wavelet or frequency-based image processing techniques, other blurring kernels (including mean, median, and extrema filters), or techniques employing location-specific enhancements.

Scaling The final step of preprocessing is to scale the image to a fixed width and height. Specifically, the image is scaled to a fixed resolution making further processing have a fixed cost. Scaling is performed using standard sampling techniques to a resolution desired by the implementation. These may include, but are not limited to, bi-linear interpolation, bicubic sampling (and those of higher order), nearest neighbor sampling, superresolution techniques, or adaptive sampling.

Image Fingerprinting 124

Identifying if two image files are in fact the same image presents a number of unique scalability and computational efficiency challenges. Rather than comparing the entire image, the system represents each image file with a small, numeric representation (i.e., a fingerprint) that encodes most of the perceptual information within the image. By doing so, images files may be compared by their fingerprints alone, resulting in a much faster and computationally efficient identification of similar images. This section outlines the process to compute an image fingerprint in detail.

Alternative signal processing techniques (such as a wavelet-based encoding, the Radon transformation, or a radial hash), single or multi-dimensional histogram encodings of the image (such as the image gradients, luminosity, brightness, or color), or a set of images features may also be used to compute the image fingerprint. Possible image features include Speeded Up Robust Features (SURF), Histogram of Oriented Gradients (HOG), Gradient Location and Orientation Histogram (GLOH), or those computed by the Scale-Invariant Feature Transform (SIFT). Alternatively, an implementation may be configured to prepare multiple perceptual fingerprints for each image.

paragraphExtracting Perceptual Information The digital representation of images does not efficiently encode the visual information perceived by the human brain. The reason for this is its discrete nature: the pixels within an image are a sampling of the underlying visual signal, rather than a parametric definition of the signal itself.

To more efficiently encode the perceptual information within an image, the system transforms the input image using the second variant of the Discrete Cosine Transform (DCT-II). In a single dimension, the DCT-II is defined by:

$$c_k = \sum_{i=0}^{N-1} x_i \cos\left[\frac{\pi}{N}\left(i+\frac{1}{2}\right)k\right] \quad k=0,\ldots,N-1 \quad (3)$$

where x is the input vector and N is the dimensional of x. Eq. 3 is referred to as simply the DCT for the remainder of this document. The output c is referred to as the DCT coefficients as it defines the weights of the cosine functions at various frequencies.

Because images are two-dimensional, the DCT is applied on each dimension sequentially (i.e., the DCT is applied across the second dimension on the output of the first). The result is a two-dimensional array C of DCT coefficients.

Perceptually, humans recognize images primarily by the large spatial variations in intensity across the image. These large spatial variations are encoded by the low-frequency coefficients of the DCT. In other words, a majority of the perceptual information within the image is represented by the low-frequency coefficients, and thus the high-frequency coefficients may be disregarded when perceptually comparing image files.

The system retains a small number of low-frequency coefficients to efficiently represent the image. Specifically, given the matrix of coefficients C, it retains N×M coefficients $$Z_{i,k} = C_{i+1,k+1} \quad i=0,\ldots,N-1, k=0,\ldots,M-1 \quad (4)$$

Note the +1 in the subscript of C. This drops the first coefficients as they simply define an intensity shift.

One can imagine other signal processing techniques for optimizing visual information from imagery. These may include different variants of the discrete cosine transform, transforms of other trigonometric functions (i.e., sin), Fourier transformations and their derivatives, wavelet techniques, feature detection (such as SIFT, SURF, and others), or methods for estimating visual information such as saliency, gaze, or attention.

Binary Encoding of Perceptual Information

While the N×M low-frequency coefficients sufficiently represent the majority of perceptual information in the image, comparing the coefficients at scale still presents challenges. Specifically, the coefficients for two images must be loaded into memory and subtracted. The system achieves further efficiency by encoding the low-frequency coefficients into a binary representation. Specifically, it $$B_{i,k} = \begin{cases} 1, & \text{if } C_{i,k} \geq \text{median}(C) \\ 0, & \text{otherwise} \end{cases} \quad (5)$$

$$i=0,\ldots,N-1, k=0,\ldots,M-1.$$

These N×M binary digits represent the spatial distribution of DCT coefficients, and effectively encode the perceptual variations within the image.

Alternative binary encoding techniques may be employed depending on the specific needs of the implementation. These techniques may include a different statistic (other than median) or moment thereof, byte-packing, conventionality reduction, or component analysis.

Comparing Fingerprints

Each image fingerprint is represented by the S=N×M binary digits. The system flattens these bits into an S-bit integer that represents the input image. Perceptually identical images have the same fingerprint, and thus can be looked up directly using any form of keyed data store. Similar images may can be identified by comparing the bits between the two image fingerprints. Specifically, the Hamming distance $$\text{Hamming}(f,g) = \sum_{i=0}^{S-1} \left[\begin{cases} 1, & \text{if } f_i = g_i \\ 0, & \text{otherwise} \end{cases}\right] \quad (6)$$

is used to identify if two images are perceptually similar. Identical images have a Hamming distance of 0 and perceptually similar images have a low Hamming distance.

Eq. 6 may be efficiently computed by Xoring the two fingerprints and then counting the bits of the result $$\text{Hamming}(f,g) = \text{Bit-count}(\text{Xor}((f,g))). \quad (7)$$

Both Bit-count and Xor are typical instructions in modern machine and or programming languages.

Image De-Duplication 126

Once an images fingerprint has been computed, the system identifies perceptually similar images in the data store. This process is referred to as de-duplication. To achieve this, the system must compare the fingerprint of the image to each fingerprint it previously encountered using Eq. 6. Though Eq. 6 is computationally efficient, it does not scale well with large data sets: each fingerprint must be compared to all the fingerprints in the data store. As social media networks expand, this becomes computationally unfeasible.

TABLE 2

FILEIDANDFINGERPRINT Table

| Fingerprint | indexed | Primary Key |
|---|---|---|
| File Id | indexed | |

Distributed Data Store

The system maintains asymptotically linear scalability by exploiting distributed data stores. The defining feature of distributed data stores is that additional computational or storage resources may be added to accommodate additional storage and lookup requests. As a result, accessing the value associated with a specific key takes an asymptotically constant amount of time, regardless of the number of keys in the data store. The system requires only that the data store technology maintains a one to many key to values relationship, and that key-value lookups take a constant amount of time (or near-linear with respect to the number of values associated with a specific key). All tables discussed in Section 4.4.4 of this disclosure are implemented with technologies that fit these requirements.

Technologies and software that fulfill these requirements include, but are not limited to, key-value No-SQL databases (e.g., Amazon DynamoDB, Apache Cassandra, Hibari, Project Voldemort, Riak, MemcacheDB), shared relational databases (e.g., CSQL, mySQL, Microsoft SQL Server, IBM DB2, NonStop SQL, PostgreSQL, SQLite, Oracle RDBMS), disk-level stores (Aerospike, BigTable, Couchbase Server, Tuple space, Oracle NoSQL Database, MongoDB), or in memory stores (e.g., OpenLink Virtuoso, Hazelcast, Oracle Coherence, Redis, Memcache).

Identifying Perceptually Identical Image Files

The primary function of the de-duplication layer is to identify perceptually similar images to a given the file id and fingerprint $f$. To achieve this, the fingerprint to file id relationship is persisted in the FILEIDANDFINGERPRINT table defined in Table 2. Here, the fingerprint to file id relation is one to many. Provided that the images have identical fingerprints, this is simply a lookup for all values associated with the image key.

Finding perceptually similar images, however, is slightly more challenging. Rather than computing the Eq. 6 for a given fingerprint and all fingerprints in the data store, the de-duplication module looks up all possible fingerprints with a hamming distance less than some threshold T for the given fingerprint $f$. Given the threshold T and number of bits S in the fingerprint, then there are $$L(S, T) = \sum_{i=0}^{T} \binom{S}{i} \quad (8)$$

possible fingerprints to lookup with a hamming distance less than or equal to T.

TABLE 3

SUBINTEGERSANDFINGERPRINTS Table

| Subinteger | indexed | Primary Key |
|---|---|---|
| Fingerprint | | |

The number of possible fingerprints given in Eq. 8 can be quite large depending on the values of T and S in the implementation. To reduce the number of necessary reads to the FILEIDANDFINGERPRINT table, the system utilizes a technique known as multi-index hashing [2]. Fleet et al. [2] describe this technique for minimizing hash table lookups, and this declaration describes the utilization of multi-index hashing for use with distributed data stores. A summary of multi-indexes hashing, as well as the contributions of this declaration, are disclosed below.

Summary of Multi-Index Hashing Multi-index hashing [2] minimizes the number of possible fingerprints given in Eq. 8 by storing a secondary index to the fingerprints that have already been processed by the system. As a result, the number of operations on Table 8 is reduced by an order of magnitude, and the distributed data store costs are minimized.

In multi-index hashing, each S-bit fingerprint $f$ is split into a M sub-integers, $f_1, \ldots, f_M$, of $$\left\lceil \frac{S}{M} \right\rceil$$

bits each. The key observation discussed by Fleet et al. [2] is that if Hamming$(f,g) \leq T$, then there exists some m such that $$\text{Hamming}(f_m, g_m) = \leq \left\lfloor \frac{T}{M} \right\rfloor. \quad (9)$$

Thus, it is sufficient to perform M·L(S/M, $\lfloor T/M \rfloor$) (where L(·) is defined by Eq. 8) lookups to find all matching fingerprints to the query fingerprint $f$.

Fleet et al. [2] discusses the use of this technique on hash tables. This disclosure presents a utilization of this technique for use on distributed data stores as discussed in the next section.

Multi-Index Hashing on Distributed Data Stores The de-duplication module leverages multi-index hashing to optimize the search for matching image fingerprints using a distributed data store 130. Specifically, it maintains a SUBINTEGERSANDFINGERPRINTS table 132 defined in Table 3. This store maintains the one to many relationship between all M sub-integers and the fingerprints that they are associated with. Specifically, given a fingerprint $f$, at the minimum the table contains M rows with the subintegers $f_1, \ldots, f_M$ and the fingerprint $f$.

Fully optimizing the procedure for identifying perceptually similar fingerprints depends on the technology used for the datastore. Specifically, the performance of writing vs. reading rows to and from the data store determines the strategy for how many rows to store for each fingerprint. If the data store is able to write records faster than read them, then M·L(S/M, $\lfloor T/M \rfloor$) rows are written for each fingerprint (one for each possible permutation of each subinteger). Alternatively, if reads are more efficient than writes, only M rows are written to the table (one for each sub-integer in the fingerprint).

Since reads are typically faster than writes, this section first presents the latter approach, and then discusses modifications for data stores that are optimized for writes.

Algorithm 2 Find Perceptually Similar Fingerprints

Require: Input fingerprint f, number of subintegers M, and tolerance T
1:    Matches ← ∅ then
2:    for $f_k \in$ Sub − Integers(f, M) do
3:        for p ∈ Permute−Bits$(f_k, \lfloor \frac{T}{M} \rfloor)$ do
4:            for g ∈ SUBINTEGERSANDFINGERPRINTS(p) do
5:                if Hamming(f, g) ≤ T then
6:                    Matches ← Matches ∪ {g}
7:                end if
8:            end for
9:        end for
10:   end for
11:   return Matches Upon digestion, the de-duplication uses the new image's fingerprint f to identify perceptually similar fingerprints. The process is detailed in Algorithm 2. Algorithm 2 utilized three sub-routines described here for completeness:

Sub-Integers($f$, M) Returns all M sub integers of $f$

Permute-Bits(a, b) Returns all permutations of integer a having up to b different bits.

Subintegers-And-Fingerprints(k) Returns all fingerprints in the SUBINTEGERSANDFINGERPRINTS table 132 associated with sub integer k.

The fingerprints returned from Algorithm 2 are then used to identify their corresponding file ids using the FILEIDAND-FINGERPRINT table 134. Afterwards, the FILEIDANDFINGERPRINT and FILEIDANDFINGERPRINT are updated with the new fingerprint, its associated sub-integers, and file id.

Clustering 128

Once perceptually similar images have been identified, the clustering layer is responsible for maintaining the groupings of file ids. Specifically, after deduplication, each file id is associated with a group (or cluster) of perceptually similar file ids represented by a canonical image id.

Algorithm 2 may be modified for data store technologies that are able to write records more efficiently than read. Specifically, the for loop in line 3 may be omitted and replaced with p←fk. Thus, only M records are read from the SUBINTEGERSANDFINGERPRINTS table. To ensure all sub-integer and fingerprint associations are returned by these reads, all permutations of each sub-integer (i.e., the result of Permute—Bits ($f_k$, $$\lfloor \frac{T}{M} \rfloor))$$

and the fingerprint are written to the database after the search. This results in M·L(S/M, $\lfloor T/M \rfloor$) writes and only M reads.

The file id and canonical id relationship is persisted by the FILEIDANDCANONICALID table 136 defined in Table 4. The file id to canonical id relationship is many to one. Note that this table is indexed on both fields, allowing a canonical id to be retrieved for a specific file id, and all file ids associated with

TABLE 4

FILEIDANDCANONICALID Table

| File Id | indexed | Primary Key |
|---|---|---|
| Canonical Id | indexed | | a canonical id to be accessed. Depending on the data store technology used, these relationships may be stored in the separate tables, so long as they are synchronized.

The process of updating a canonical grouping is described in Algorithm 3, the details of which are discussed in the remainder of this section.

When digesting a new image file, the clustering module decides which canonical group the file will belong to and updates the FILEIDANDCANONICALID table. A new image may in fact match different canonical groups. When this occurs, the clustering module must decide how to handle the canonical groups based solely on the hamming distance between the relevant fingerprints. To achieve this, the clustering algorithm implements an agglomerative hierarchical clustering technique with complete linkage clustering. Complete linkage clustering requires that all members of a specific canonical group have a hamming distance within some bound R. This constraint is enforced by the Can-Merge function in line 1 of Algorithm 3.

It is possible that the new image defines a clustering linkage between multiple existing groups. In such a case, the groups are merged together to form a new group using the Merge-Group function on line 10 of Algorithm 3.

Each canonical id is a randomly generated universally unique identifier (UUID), a standard defined in [1]. When a new group is to be created, the function New-UUID creates a new UUID to serve as the canonical id. This occurs when either the image does not have any perceptual matches (i.e., a new group is formed), or the image results in the merging of groups due to their linkage candidacy.

One can imagine other embodiments that utilize different clustering techniques, be they immediate or delayed, to achieve a similar result. These may include, but are not limited to, hierarchical clustering with different linkage criteria, divisive hierarchical clustering techniques, K-means, nearest neighbor methods, and machine-learning based techniques such as those utilizing support vector machines, Gaussian processes, or mixture models.

It is to be understood that while variations of the clustering technique can be used, not all techniques are suitable for large scale or scalable applications. For example, in one aspect of the data pipeline, the 'Image Processing Service' was not called out as its own standalone component. Rather, its logic was tightly coupled with the Facts Service and the Brands service. While this implementation was functional, in practice it did not scale well as the dataset grew.

In addition, while it is possible to handle the clustering step in real time—when queried for analytics around an image, the system would attempt to first find related images and then combine their results. In practice, this clustering step made it intractable to run certain types of queries against the data. Instead, the preferred approach is to "pre-cluster the world" whereby the system builds and maintains clusters of related images as they are found. As an example, the preferred system and method have been capable of examining over 200 mm images per day, and have over 600 mm unique images in the library. Clearly, it is intractable to apply any sort of clustering algorithm on a dataset of that size in real-time. The present disclosed solution presents a novel method for building and maintaining those clusters in as images are ingested.

Brands Service

The Brands service is configured to be responsible for the final step in the workflow, which is the mapping of images (and, by association, interactions) to brands and products.

Tables

The resulting brand-interaction mapping (as well as the configuration data required to make the association in the first place) is persisted in a database. As

---

Algorithm 3 Update Image Canonical Group

---

Require: Input fingerprint f, file id fid, number of subintegers M, and tolerance T, and clustering criterion $\mathcal{R}$
1: function CAN-MERGER(f, G)
2:    for g ∈ G do
3:       if Hamming(f, g) ≥ $\mathcal{R}$ then
4:          return false
5:       end if
6:    end for
7:    return true
8: end function
9:
10: function MERGE-GROUPS(OldIds, NewId)
11:    for c ∈ OldIds do
12:       for f ∈ FILEIDANDCANONICALID(canonicalId) do
13:          Remove (c, f) from FILEIDANDCANONICALID table.
14:          Insert (NewId, f) into FILEIDANDCANONICALID table.
15:       end for
16:    end for
17: end function
18:
19: G ← FIND-PERCEPTUALLY-SIMILAR-FINGERPRINTS(f, M, T)
20: FileIds ← ∅
21: for g ∈ G do
22:    FileIds ← FileIds ∪ FILEIDANDFINGERPRINT(g)
23: end for
24: CurrentIds ← ∅
25: for id ∈ FileIds do
26:    CurrentIds ← CurrentIds ∪ FILEIDANDCANONICALID(id)
27: end for
28: if |CurrentIds| = 0 then
29:    id ← NEW-UUID( )
30: else if |CurrentIds| = 1 then
31:    id ← CurrentIds
32: else
33:    if CAN-MERGE(f, G, T) then
34:       id ← NEW-UUID( )
35:       MERGE-GROUPS(CurrentIds, id)
36:    else
37:       id ← BIGGEST-GROUP(CurrentIds)
38:    end if
39: end if
40: Insert (id, fid) into FILEIDANDCANONICALID table.

TABLE 5

BRANDIMAGES Table

| Brand Id | indexed | Primary Key |
|---|---|---|
| File Id | indexed | |

TABLE 6

BRANDINTERACTIONS Table

| Brand Id | indexed | Primary Key |
|---|---|---|
| Network | indexed | |
| Interaction Type | indexed | |
| Interaction Identifier | indexed | |
| File Id | | |
| Product Id | | |
| Other meta-data | | | the data at this level is typically derived from data in the Facts layer, it is not critical to enforce an append-only policy. In one implementation, a MySQL datastore partitioned (sharded) by Brand Id is used. Alternative implementations that use other relational database engines or a NoSQL database are possible.

The BRANDIMAGES table is critical because it provides as a starting point a set of known brand images, each associated with a File Id. How this table is initially populated is dependent on the brand in question. If the brand has a library of images in an easily-readable format (such as a ZIP archive full of JPEG files), then it is a straightforward task to manually provide this initial dataset. For brands without easy access to an image archive, this table can be populated by performing an exhaustive web crawl of the brands web site(s), retrieving all unique images. Finally, the third option is to not pre-populate this table for a brand, and instead populate it on-the-fly using metadata clues gleaned from social interaction data as it arrives (to be discussed below). In all cases, each image in this table must be stored on durable media by the Image Service.

The BRANDINTERACTIONS table provides a cross-reference between brand and visual interactions. Each interaction is associated with a File Id as well as (optionally) a Product Id.

BRANDCANONICALIMAGES provides an additional layer of brand-specific image canonicalization. This allows brands to merge together similar (albeit not

TABLE 7

BRANDCANONICALIMAGES Table

| Brand Id | indexed | Primary Key |
|---|---|---|
| File Id 1 | | |
| File Id 2 | | |

TABLE 8

BRANDPRODUCTIMAGES Table

| Brand Id | indexed | Primary Key |
|---|---|---|
| Product Id | | |
| File Id | | | perceptually-identical) brand photos. These images groupings can be manually configured via a brand-facing user interface, or they can be algorithmically calculated by relying on rules configured by the user (example: ignore whitespace borders on images).

Finally, BRANDPRODUCTIMAGES provides a brand-specific mapping between brand images and brand products. Specifically, this allows users to group together related images without losing the ability to segment data on a image-specific basis.

Real-Time Processes

The algorithm applied to incoming interactions to the Brands Service is applied independently on behalf of each potential brand.

The initial step is to attempt to apply brand-specific canonicalization to the File Id associated with the current interaction. At this point, an attempt can be made to match the File Id to a Product Id associated with the brand. These queries can both be easily implemented given the table definitions described above.

The next step is to check if the image (as canonicalized) is a known brand image. Again, the implementation of this query follows directly from the definition of the BRANDIMAGES table. If this is a known brand image, then the interaction should be persisted in the BRANDINTERACTIONS table.

If the image (as canonicalized) is not a known brand image, the interactions metadata needs to be inspected; it may indicate that it should be considered as a brand interaction. For example: in the case of a pin from Pinterest, the pin may include meta-data indicating that it was originally pinned from mybrand.com.

If the metadata does indicate that this is a brand interaction, then the system proceeds to take three steps:

1. This File Id is associated with the current Brand Id in the BRANDIMAGES database.
2. This interaction is persisted in our BRANDINTERACTIONS table.
3. Because up until now, this File Id has not been associated with the current brand, relevant brand interactions may have been missed. To defend against this, the Facts layer is returned to and queried for all interactions associated with this File Id. The same will be done for any file ids that have been canonicalized to File Id at the brand-level. (See pseudocode below). The query back to Facts may be implemented asynchronously using message passing given its potentially long runtime.

Pseudocode

```
void function receive(interaction) {
    alias BCI = BrandCanonicalImages
    alias BPI = BrandProductImages
    foreach(brand) {
        // Perform brand-specific canonicalization and
        // product mapping.
        set image_id =
            BCI.where(image_id =
interaction.image_id).select(canonical_image_id) ||
interaction.image_id
        set product_id = BPI.where(image_id =
image_id).select(product_id)
        // Is this a known brand image? If so, save the interaction.
        if (isKnownBrandImage(brand, image_id)) {
            BrandInteraction.save(brand_id, interaction, image_id,
            product_id)
            continue; // move on to the next brand
        }
        // This isn't a known brand image. Does the available
        // metadata tell us that this does indeed belong to the
        // brand? If so, we should record the interaction and
        // update our brand image library. Finally, we'll
        // now want to go back to our facts layer and look for any
        // other interactions with this image that we've previously
        // missed.
        if (isBrandInteraction(brand, interaction.meta)) {
            BrandImages.save(brand_id, image_id)
            BrandInteraction.save(brand_id, interaction, image_id,
            product_id)
            set all_image_ids = image_id ::
                BCI.where(canonical_image_id =
                image_id).select(image_id)
            set interactions = Facts.Interactions.where(image_id in
all_image_ids)
            interactions.foreach( => receive)
        }
    }
}
```

Alternatives

In the implementation of the Brands Service described above, the BRANDINTERACTIONS cross-reference table is built for later analysis, perhaps via a batch job implemented in Hadoop. However, in alternative implementations, the addition of a row to the BRANDINTERACTIONS table could trigger an event in real-time, such as a client notification via email or an automatic recalculation of one or more derived statistic.

Representative Implementations

The platform is designed to be implemented on commodity hardware in a cloud-computing environment. As such, minimal use is made of shared state. The system implements processes that are highly parallelizable. Preferably, the system utilizes exclusively EC2 hardware. More concretely:

The mining service is implemented as a heterogeneous cluster of commodity hardware w/ adequate network performance.

The facts service consists of two physical components:

(1) A homogenous cluster of commodity hardware involved in the processing step. For these computing instances, high CPU and memory are important. This is currently implemented as an Apache Storm topology consisting of approximately 40 c3.large nodes; and (2) A distributed datastore for storing metadata around the visual interactions. Here the important requirement is multiple spinning disks (or SSDs) that are physically attached (as opposed to network storage). This is currently implemented using a Cassandra database consisting of 30 m1.xlarge nodes, each with 4×420 GB drives, configured w/ RAID striping and parity.

The Brands Service is also implemented as a storm topology consisting of 50 c3.large nodes.

The Image Processing Service consists of three physical components:

(1) A homogenous cluster of commodity hardware involved in the processing step. For these computing instances, extremely high CPU is needed. This is currently implemented using 5 c1.xlarge nodes;

(2) A distributed medium-latency key-value store for the images themselves. Currently Amazon S3 is used; and (3) A distributed low-latency key-value store for the image metadata (the tables described above). Currently Amazon DynamoDB is used for this.

Figure 3:
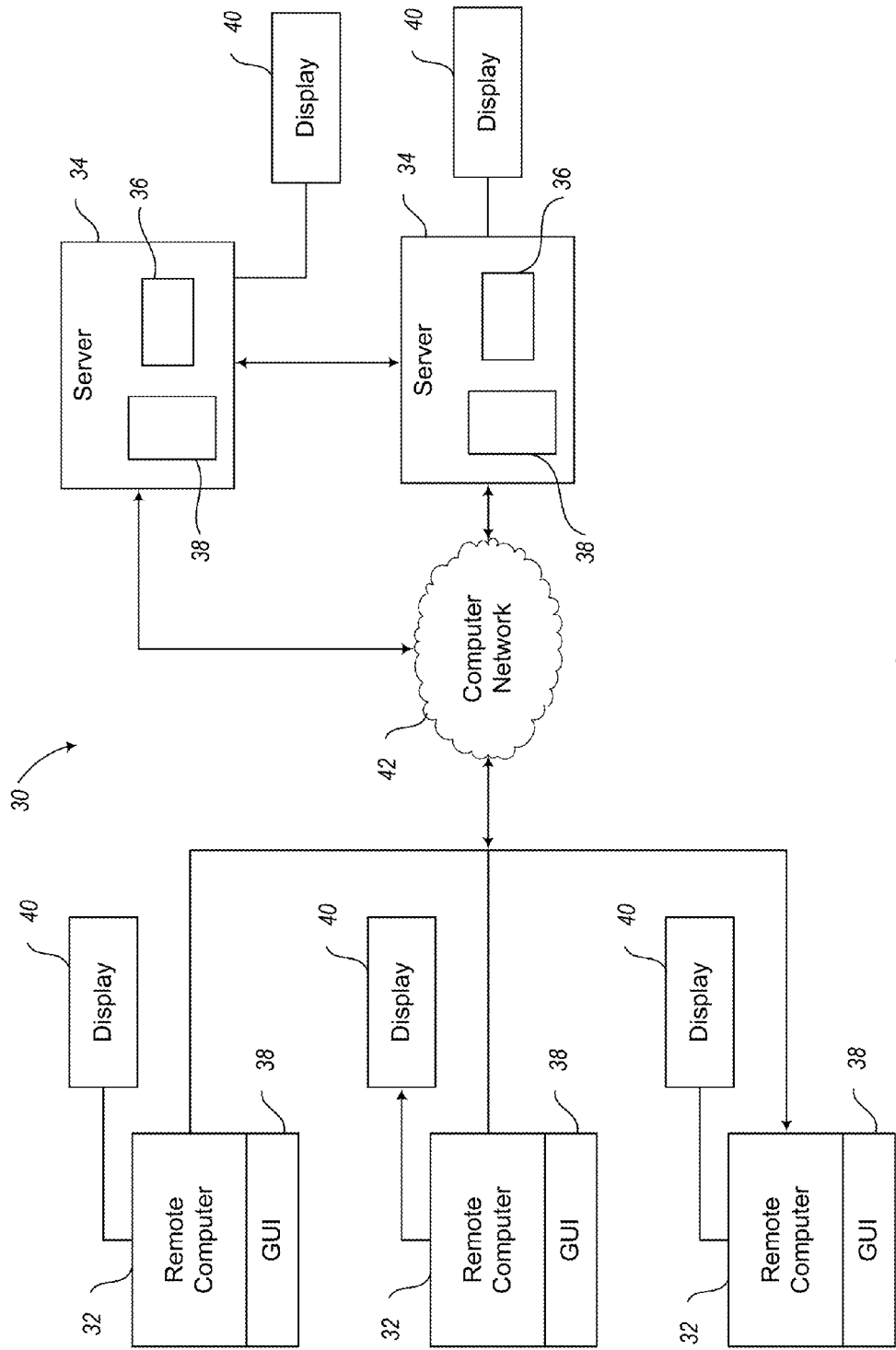
FIG. 3 is a schematic of system architecture in accordance with one implementation of the system and method of the present disclosure.

Turning now to the FIG. 3, shown therein is a representative implementation of the system and method described above. This implementation is described in the general context of a computer network 30, as is well known in the industry, and computer executable instructions that are executed by one or more commodity hardware such as general purpose computing devices associated with the computer network 30. The computing devices are configured as remote computers 32, and one or more servers 34. Application software 36 is provided on the servers 34, which are configured to have at least one and preferably a plurality of databases 38 structured to store the retrieved and received image data and related information as described above. The application software 36 may reside on the server 34. Further, it is preferable that users access the application software 36 through an internet browser that functions as an interface between the application software 36 and the operating system for the remote computers 32. The server 34 could employ any one of the currently existing operating systems. In addition, it should be appreciated by those with skill in the art that other applications besides the browser may also be utilized to act as an interface between the application software 36 and the remote computers 32 as described herein.

A graphical user interface 38 can be utilized that includes various menu bars, drop-down menus, buttons, and display windows. A detailed description of the graphical user interface 38, the menu bars, drop-down menus, exemplary buttons and display windows, and the functionality associated with those menus, buttons and windows, is not described in detail herein inasmuch as providing such is well within the level of ordinary skill in this technology.

As will be readily understood, the commodity hardware need not be limited to personal computers, but may include without limitation mainframe computers, personal digital assistants, cellular telephones, hand-held devices, multiprocessor systems, microprocessor-based or programmable consumer electronics, minicomputers or the like and configured for their desired use within the system. For performing the procedures described hereinafter, the computer executable instructions may be written as routines, programs, objects, components, and/or data structures that perform particular tasks. Within the network 30, the application software such as computer executable instructions may reside on a single remote computer 32 or server 34, or the tasks performed by the application software may be distributed among a plurality of the computers 32, 34. While described in the context of a computer network, it should also be understood certain aspects of the disclosed system and method may be implemented in a stand-alone, general purpose computing device that may not necessarily be connected to a computer network.

To efficiently provide users with access to the application software 36, the server computers 34 and the underlying framework for the computer network 30 may be provided by the service company itself or by outsourcing the hosting of the application software 36 to an application service provider ("ASP"). ASP's are companies that provide server computers that store and run a software application for a third party entity, which is accessible to the third party entity's users via the Internet or similar means. Therefore, the server computer for operating the software application may be hosted on a computer that is owned and maintained by another party and users may then access and use application software applications via the host computer without storing the software application on the remote computers. A well-known model is the Application Service Provider (ASP), which provides server computers that store the data and the application software that is accessible by the user via the Internet or other network environment.

To perform the method, processes, procedures, and tasks disclosed herein via the application software, the computers 32, 34 may include, as needed, a display device 40, such as a video adapter, a video display device, a processing unit, a system memory, and related system bus that is configured to couple the system memory to the processing unit. The video adapter is configured to enable the computers 32, 34 to support the video display device, which may take the form of a cathode ray tube ("CRT"), a liquid crystal display ("LCD"), a flat screen monitor, a touch screen monitor or similar device to display textual and graphical data to the user. The display device enables a user to view information, such as code, file directories, error logs, execution logs and graphical user interface tools.

The computers 32, 34 may be further configured to include a hard disk drive for reading from and writing to a hard disk, a read only memory (ROM), a magnetic disk drive for reading from and writing to a magnetic disk, or an optical disk drive for reading from and writing to a removable optical disk or any other suitable data storage device. The hard disk drive, magnetic disk drive, and optical disk drive may be connected to the system bus by a hard disk drive interface, a magnetic disk drive interface, or an optical disk drive interface, respectively, or other suitable data interface. The drives and their associated computer-readable media provide a means of non-volatile storage for the computer executable instructions and any other data structures, program modules, databases, arrays, etc. utilized during the operation of the computers 32, 34.

To connect the computers 32, 34 within the network, a network interface or adapter is utilized. In a wide area network environment, such as the Internet, a network interface, such as a router, modem, either hardwired or wireless, or a similar device is employed. The network connections are provided as exemplary implementations and other means of establishing a communications link among the computers 32, 24 can be employed. The network interface may also utilize TCP/IP, FTP, SFTP, Telnet SSH, HTTP, SHTTP, HTTPS, RSH, REXEC, etc. and other network connectivity protocols.

In one representative implementation, the application software 36 and databases reside on the server 34 and are managed either by the provider of the application software 36 or by a third-party or both. Those with skill in the art will understand, however, that the application software 36 and databases may reside on the remote computer 32 or different computers and may be managed and maintained by the user. The graphical user interface is configured to utilize HTTP or HTTPS or any other suitable format to load and display web pages and other information.

In order to accommodate exponentially increasing amount of image-related content, additional computational resources available via cloud computing may be included in the system. As commonly understood, "cloud computing" means the use of remotely located database and processing resources available over a public network, such as the Internet. Such resources can include a virtual or physical computer coupled to a worldwide network of computers, such as the Internet, or other public network. In order to provide such computational resources via a cloud network on a secure basis, commercially available security encryption protocols such as SSL and PGP may be included in the system.

In accordance with one aspect of the present disclosure, the application software 36 and databases 38 may reside on a computer that is connected to a computer network, such as a cloud computing network 42 or the application software 36 and databases 38 may reside on a computer that forms part of the cloud computing network 42. The cloud computing network 42 may also be used to process electronically stored that could involve several million pages of documents and encompass multiple terabytes of information. The ability to use low-cost alternatives to traditional computing needs, therefore, may have a significant impact on reducing the cost and resources necessary to receive and retrieve image data, process the data, and extract useful information therefrom.

It will be appreciated that various types of distributed processing may be relied upon in the disclosed system. Because of the computational resources required to perform the describe method and process, multiple commodity hardware are coupled together via the Internet or other form of network connection. The use of a cloud computing network alleviates the severe demand for computational resources and decreases the overhead cost associated with processing the image data as described herein. For example, the architecture of the cloud computing network can encompass use of a private network, a web host, or a combination thereof. As will be readily understood, a cloud computing architecture provides an expandable storage resource as well as a plurality of virtual computers to process the electronically stored image and brand data.

In summary, in accordance with one aspect of this disclosure, a computer-implemented method or process is provided that includes receiving, by a configured computing system, image information including at least an image file, the image file used to represent the visual portion of the image; modifying, by the configured computing system, the image file, the modifying including removing information from the visual portion of the image represented by the image file to enable further analysis of the image file; analyzing, by the configured computing system, the modified image file to determine a numeric representation of the modified image represented by the modified image file, the numeric representation of the modified image containing encoded characteristics of at least some visual characteristics of the modified image; storing, by the configured computing system, the modified image file and the numeric representation of the modified image to enable comparison of the modified image to other modified images. In one aspect, the image file is in a location on an Internet site.

Modifying the image file further includes extracting the luminance channel of the image contained in the image file; removing background of the image contained in the image file; blurring the image contained in the image file, the blurring reducing pixel noise within the image; and resizing the image contained in the image file to a determined width and a determined height.

Analyzing the modified image file to determine a numeric representation of the modified image represented by the modified image file further includes determining a low frequency coefficient matrix for the modified image based on a discrete cosine transform applied to the modified image contained in the modified image file; and determining a binary encoding for the determined low frequency coefficient matrix.

The foregoing method also includes retrieving stored numeric representations of previous image files; comparing the numeric representation with the retrieved numeric representations to determine one or more matches; if there is a match, updating, using the matched stored numeric representations, the one or more matched stored image files with the image information; if there is no match, storing the modified image file and the numeric representation of the modified image to enable comparison of the modified image to other modified images. Comparing the numeric representation with the retrieved numeric representations further includes using multi-index hashing. In accordance with another aspect of the present disclosure, an image-centric method of obtaining and processing brand image data from online social media sites and other online sources to determine and measure brand interactions by social network users. The method includes:

collecting images in a configured computing system of brands and related products and services along with data associated with the brands and related products and services from the online social media and other online and offline sources;

processing the collected images and associated image data by the configured computing system to assign each collected image a unique image identifier and to organize the associated image data into clusters, each cluster of image data having a single common datum;

storing the clusters of image data by the configured computing system in a database on a virtual storage medium accessible by the configured computing system via a computing network;

providing instructions by the configured computing system to at least one of a plurality of virtual computers coupled to the computing network to access the virtual storage medium and assign each unique image identifier with zero or more clusters of data, and to extract data regarding one or more of the clusters to which the unique image identifier has been assigned, wherein providing instructions to each of the plurality of virtual computers includes:

providing instructions from a user's computer to the at least one virtual computer of the plurality of virtual computers coupled to the computing network to access the virtual storage medium and assign the image to only clusters of data that are associated with the image and to extract data therefrom;

receiving the instructions by the computing network and uploading the instructions to the at least one virtual computer for execution of the uploaded instructions by the at least one virtual computer; and providing the user access on the user's computer via the virtual computing network to the extracted data.

More generally, the method at a high level includes obtaining a digital image; associating the digital image with a unique identifier and with one or more digital representations of the image's visual information; organizing the digital images into data clusters in which each data cluster represents a visually similar image; and storing each data cluster in a database in an electronic memory. Images are considered perceptually similar or visually similar if their digital representations have a hamming distance under a fixed distance (as disclosed in the algorithm, which can be parameterized). In one aspect, the process looks for images that have a hamming distance of 2 or less. The organizing of visually similar images would include organizing the digital images into data clusters in which each data cluster represents images with similar digital representations of visual information.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   obtaining a plurality of digital images;
   for each digital image of the plurality of digital images:
     associating the digital image with a unique identifier;
     generating perceptual information from the digital image;
     determining a digital fingerprint for the digital image by converting the perceptual information into a numerical value; and
     comparing the digital fingerprint of the digital image to the digital fingerprints of at least a portion of the plurality of digital images by comparing a sub-value of the numerical values of the digital fingerprints to determine perceptually similar images;
   clustering the perceptually similar images together and assigning a canonical identifier to each digital image in a given cluster; and
   storing each data cluster in a database in an electronic memory by storing a relationship between the unique identifier and the canonical identifier of each corresponding digital image of the plurality of digital images.

2. The method of claim 1, wherein the perceptual information for the digital image is determined by:
  determining a luminance channel of the digital image;
  removing a background of the digital image;
  blurring the digital image to reduce pixel noise within the digital image; and
  resizing the digital image to a predetermined width and a predetermined height.

3. The method of claim 2, wherein comparing the digital fingerprint of the digital image to the digital fingerprints of at least a portion of the plurality of digital images includes using multi-index hashing on the sub-values of the numerical values of the digital fingerprints.

4. The method of claim 1, wherein the perceptively similar images are digital images with their numerical values of their digital fingerprints having a hamming distance under a fixed distance.

5. The method of claim 4 wherein the fixed distance comprises 2 or less.

6. The method of claim 1 wherein determining the digital fingerprint includes:
  determining a low frequency coefficient matrix for the perceptual information based on a discrete cosine transform applied to the perceptual information; and
  determining the numerical value for the digital fingerprint as a binary encoding of the determined low frequency coefficient matrix.

7. A computer-implemented method comprising:
  receiving, by a configured computing system, image information including at least an image file, the image file used to represent the visual portion of an image;
  modifying, by the configured computing system, the image file;
  analyzing, by the configured computing system, the modified image file to determine a numeric representation of a modified image represented by the modified image file, the numeric representation of the modified image containing encoded characteristics of at least some visual characteristics of the modified image;
  storing, by the configured computing system, the modified image file and the numeric representation of the modified image to enable comparison of the modified image to other modified images; and
  determining perceptually similar images based on a plurality of modified image files having a difference between their numerical representations within a predefined threshold;
  clustering the perceptually similar images together and assigning a canonical identifier to each modified image file in a given cluster.

8. The computer-implemented method of claim 7 wherein the difference between the numerical representations of the plurality of modified image files is based on a hamming distance between the numerical representations.

9. The computer-implemented method of claim 7 wherein modifying the image file further comprises:
  extracting a luminance channel of the image contained in the image file;
  removing a background of the image contained in the image file;
  blurring the image contained in the image file, the blurring reducing pixel noise within the image; and
  resizing the image contained in the image file to a determined width and a determined height.

10. The computer-implemented method of claim 7 wherein analyzing the modified image file to determine the numeric representation of the modified image represented by the modified image file further comprises:
  determining a low frequency coefficient matrix for the modified image based on a discrete cosine transform applied to the modified image contained in the modified image file; and
  determining a binary encoding for the determined low frequency coefficient matrix.

11. The computer-implemented method of claim 7 wherein determining the perceptually similar images further comprises:
  retrieving stored numeric representations of previous image files;
  comparing the numeric representation with the retrieved numeric representations to determine one or more matches;
  if there is a match, updating, using the matched stored numeric representations, the one or more matched stored image files with the image information;
  if there is no match, storing the modified image file and the numeric representation of the modified image to enable comparison of the modified image to other modified images.

12. The computer-implemented method of claim 11 wherein comparing the numeric representation with the retrieved numeric representations further comprises using multi-index hashing.

13. A system, comprising:
  an ingest service component configured to receive and retrieve brand images and associated brand image data from social media interactions obtained from monitored online social media sites or other online or offline platforms;
  a facts service component configured to organize the ingested brand images into common data structures and persisting the common data structures on durable media;
  an image service component configured to cluster visually similar brand images and to associate each social media interaction with a unique image identifier,. including:
    for each image of the ingested brand images:
      generating perceptual information from the image;
      determining a digital fingerprint for the image by converting the perceptual information into a numerical value; and
      comparing the digital fingerprint of the image to the digital fingerprints of at least a portion of the ingested brand images by comparing the numerical values of the digital fingerprints to determine visually similar brand images;
    clustering the visually similar brand images together and assigning a canonical identifier to each image in a given cluster; and
  a brands service component configured to use the unique image identifier and the canonical identifier of the ingested brand images to associate each social media interaction with one or more clusters of visually similar brand images.

14. The system of claim 13 wherein the perceptual information for the image is determined by:
  extracting a luminance of the image;
  removing a background of the image;
  blurring the image to reduce pixel noise within the image; and
  resizing the image to a predetermined size.

15. The system of claim 13 wherein the ingest service component, the facts service component, the image service component, and the brands service component are further configured to continuously maintain the database by merging related clusters and splitting unrelated clusters based on the numerical values of the digital fingerprints of the ingested brand images in each cluster.

16. The system of claim 13 wherein the brands service component is configured to measure engagement of social network users with the retrieved brand images and generate statistics based on the measured engagement.

17. An image-centric method of obtaining and processing brand image data from online social media sites and other online sources to determine and measure brand interactions by social network users, the method comprising:
  collecting images in a configured computing system of brands and related products and services along with data associated with the brands and related products and services from the online social media and other online and offline sources;
  generating a plurality of image clusters by
    for each image of the ingested brand images:
      assigning a unique image identifier to the image;
      generating perceptual information from the image;
      determining a digital fingerprint for the image by converting the perceptual information into a numerical value; and
      comparing the digital fingerprint of the image to the digital fingerprints of at least a portion of the ingested brand images by comparing the numerical values of the digital fingerprints to determine visually similar brand images;
    clustering the visually similar brand images together and assigning a canonical identifier to each image in a given cluster;
  storing the plurality of clusters of image data by the configured computing system in a database on a virtual storage medium accessible by the configured computing system via a computing network;
  providing instructions by the configured computing system to at least one of a plurality of virtual computers coupled to the computing network to access the virtual storage medium and assign each unique image identifier with zero or more clusters of data, and to extract data regarding one or more of the clusters to which the unique image identifier has been assigned, wherein providing instructions to each of the plurality of virtual computers includes:
    providing instructions from a user's computer to the at least one virtual computer of the plurality of virtual computers coupled to the computing network to access the virtual storage medium and assign the image to only clusters of data that are associated with the image and to extract data therefrom;
    receiving other instructions and uploading the other instructions to the at least one virtual computer for execution of the uploaded instructions by the at least one virtual computer; and
    providing the user access on the user's computer via the computing network to the extracted data.

18. The method of claim 17 further comprising continuously maintaining the database by merging related clusters and splitting unrelated ones based on the numerical values of the digital fingerprints of the ingested brand images in each cluster.

19. The method of claim 17, wherein the providing the user access further comprises measuring engagement of social network users with the extracted data and providing measurable statistics based on the measured engagement.

* * * * *